United States Patent
Sun et al.

[19]

[11] Patent Number: 6,072,602
[45] Date of Patent: *Jun. 6, 2000

[54] INFORMATION READING APPARATUS HAVING A UNIVERSAL CONTACT IMAGE SENSOR CARRIAGE

[75] Inventors: Chung-Yeuh Sun, Tainan; Kun-Ming Tseng, Hsinchu, both of Taiwan

[73] Assignee: Mustek Systems, Inc., Hsinchu, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/917,107

[22] Filed: Aug. 25, 1997

[30] Foreign Application Priority Data

Mar. 11, 1997 [TW] Taiwan .................................. 86203749

[51] Int. Cl.[7] ...................................................... H04N 1/04
[52] U.S. Cl. .......................................... 358/497; 358/483
[58] Field of Search .................................... 358/497, 494, 358/483, 482, 474; 382/312; 399/211; 250/234–236, 208.1

[56] References Cited

U.S. PATENT DOCUMENTS

| 5,194,898 | 3/1993 | Costrop et al. | 358/497 |
| 5,221,970 | 6/1993 | Sakamoto et al. | 358/400 |
| 5,610,731 | 3/1997 | Itoh | 358/497 |
| 5,801,851 | 9/1998 | Sheng | 358/497 |
| 5,900,951 | 5/1999 | Tsai | 358/497 |
| 5,999,277 | 12/1999 | Tsai | 358/497 |
| 6,005,685 | 12/1999 | Tsai | 358/497 |

*Primary Examiner*—Cheukfan Lee
*Attorney, Agent, or Firm*—Sughrue, Mion, Zinn, Macpeak & Seas, PLLC

[57] ABSTRACT

The invention discloses a universal Contact Image Sensor (CIS) carriage for a flatbed scanner which can be adapted to various guiding and supporting structures, thereby to simplify the structure of the scanner and reduce the manufacture cost and maintenance fee. The CIS carriage consists of a bar-shaped carriage for holding a CIS module, a plurality of elastic elements, and a CIS module. The CIS carriage is lifted up to contact tightly with the bottom surface side of the sheet table to assure the sheet in focus, thereby to generate stable picture quality of images.

5 Claims, 3 Drawing Sheets

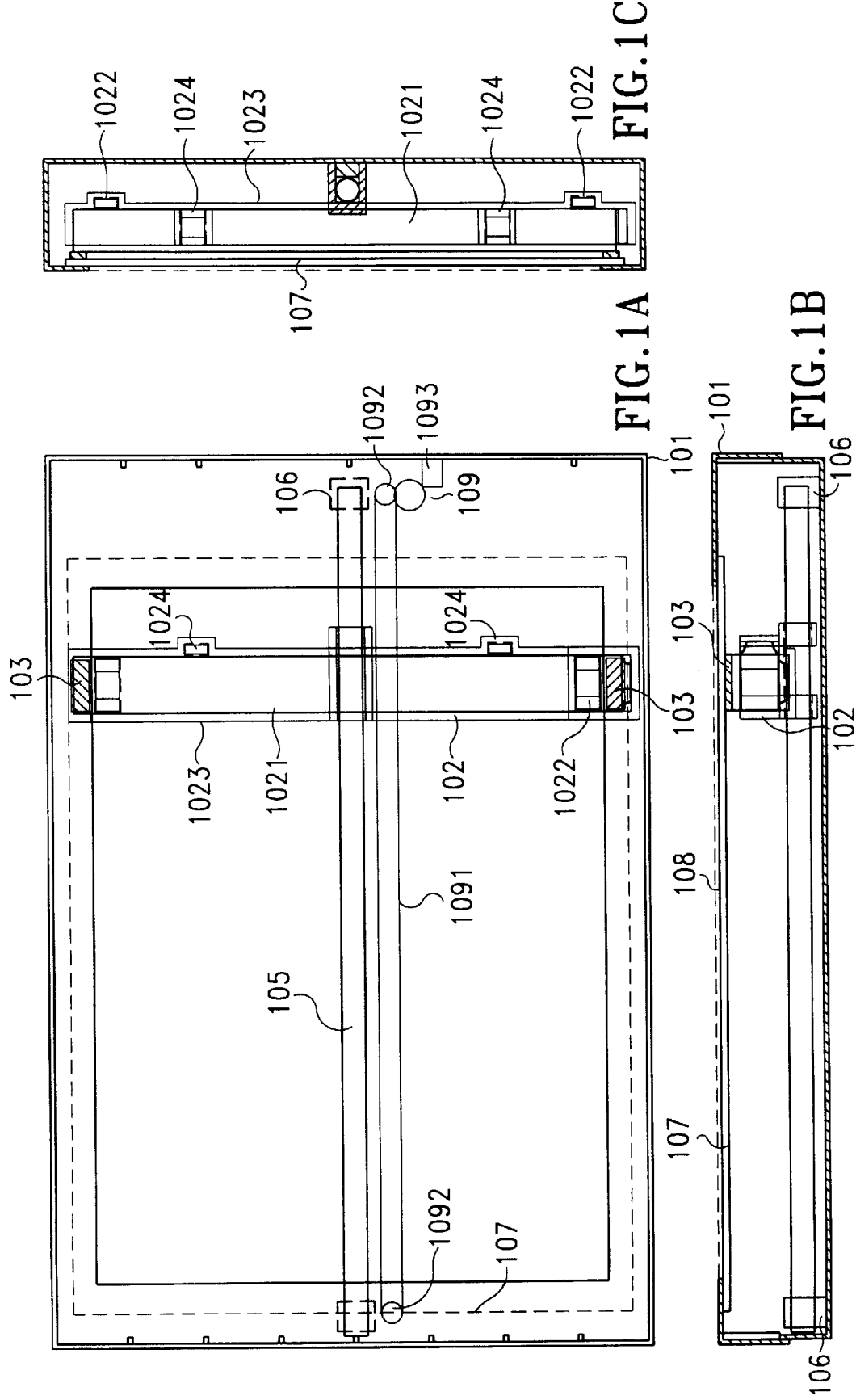

INFORMATION READING APPARATUS HAVING A UNIVERSAL CONTACT IMAGE SENSOR CARRIAGE

BACKGROUND Of THE INVENTION

A. Field of the Invention

The invention relates to a Contact Image Sensor (CIS) scanner, especially to a scanner having a universal Contact Image Sensor (CIS) carriage for adapting to guiding devices of various structures, thereby to simplify the inner structure of the scanner.

B. Description of the Prior Art

The advantages of applying a CIS module in a flatbed scanner have been considered as a solution for simplifying the structure for a low-end scanner. A new approach intends to replace a CCD line image sensor with a CIS contact sensor for low-end scanners because a CIS module is compact and easy to install. The CIS module contains all the optical members, such as light source, mirrors, and photo-electric converting device in a bar-shaped module. Since the CIS module can be manufactured and purchased from the third party, the job of trouble-shooting and installation will be much easier than a conventional CCD line sensor. Nevertheless, this new approach did not prevail because there is no breakthrough on the structure of a flatbed scanner yet to overcome the problem of short scene depth of a CIS module. It is known that the scene depth of a CIS module is only about 0.3 mm. It will be very easy for the sheet to shift away from its scene depth if manufacturing errors or distortions are not avoidable.

SUMMARY OF THE INVENTION

The object of the invention is to provide a universal CIS carriage which can be adopted to guiding devices of various structures for a CIS scanner, thereby to simplify the inner structure of the scanner and save the manufacturing cost and maintenance fee.

Another object of the invention is to provide a CIS information reading apparatus which comprises a guiding device for supporting the universal CIS carriage to contact tightly with the bottom surface side of the sheet table, thereby to keep the sheet in focus.

A further object of the invention is to provide a CIS information reading apparatus which can generate stable and good picture qualities of images.

Accordingly, the invention provides a universal CIS carriage which can be adapted to various guiding and supporting structures. The CIS carriage is bar-shaped. The length of the CIS carriage is equal to or longer than one side of the sheet table to linearly read the image information from the sheet. The CIS carriage consists of a CIS module, a plurality of elastic elements and a fitting carriage. The elastic elements are installed at the bottom of CIS carriage for adjusting the height of the CIS module. The CIS carriage is mounted on at least a guiding device for guiding and supporting the CIS carriage in a manner that the CIS module can contact tightly with the bottom surface side of the sheet table. On the top surface of the CIS module, there are two pieces of sliding elements for reducing the friction between the CIS module and the sheet table. The CIS carriage is driven by a driving device which can move the CIS carriage along the sheet table while reading the image information from the sheet.

BRIEF DESCRIPTION OF THE DRAWINGS

These and other objects and advantages of the present invention will become apparent by reference to the following description and accompanying drawings wherein:

FIG. 1A is a perspective top view schematically showing the structure of a preferred embodiment of the invention.

FIG. 1B is a perspective side view schematically showing the structure of a preferred embodiment of the invention.

FIG. 1C is a perspective front view schematically showing the structure of a preferred embodiment of the invention.

DETAILED DESCRIPTION OF THE PREFERRED EMBODIMENTS

Figure 2A:
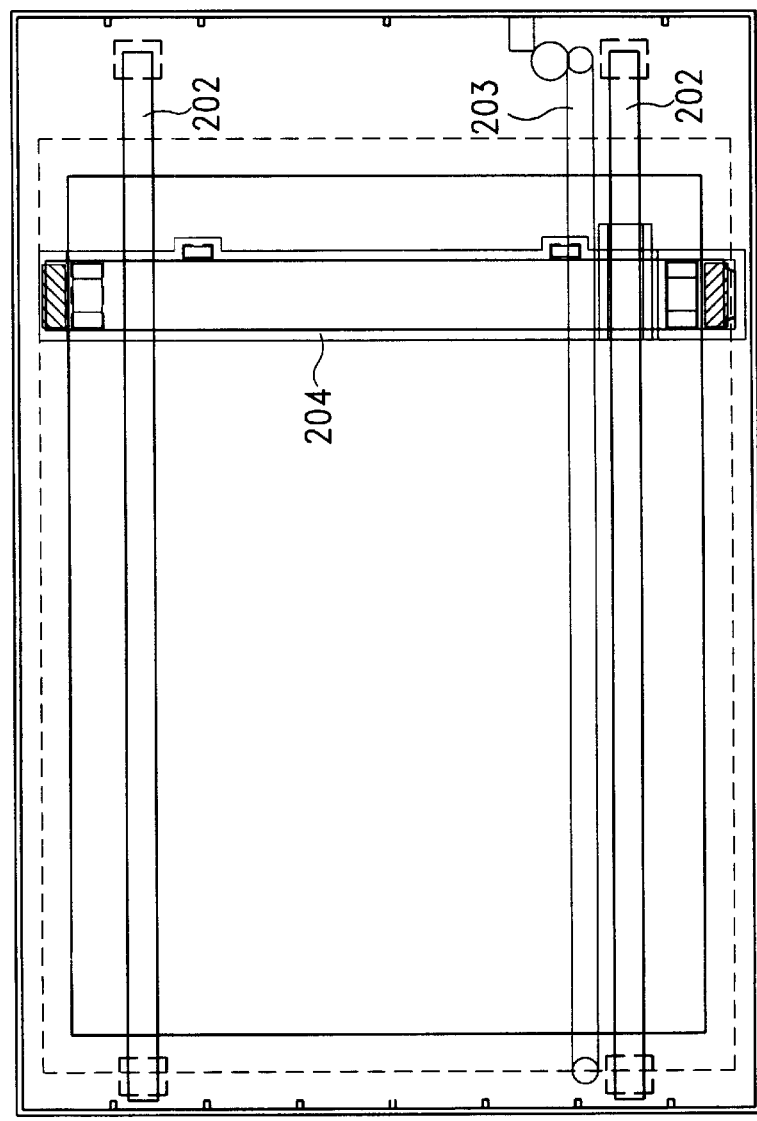
FIG. 2A is a perspective top view schematically showing the structure of another preferred embodiment of the invention.

A few preferred embodiments of the invention are described below. This embodiment is merely exemplary. Those skilled in the art will appreciate that changes can be made to the disclosed embodiment without departing from the spirit and scope of the invention.

According to the objects stated above, a preferred embodiment of the invention is illustrated in FIGS. 1A–1C. The embodiment of FIGS. 1A–1C shows a CIS carriage mounting on a single guiding device. The embodiment includes: a sheet table 107, a CIS carriage 102, a guiding device 105, and a driving device 109.

The embodiment of the invention is inside a housing 101 which is in a form of a box. The sheet table 107 is on top of the housing 101 for supporting a document sheet. The CIS carriage 102 consists of a CIS module 1021, a carriage 1023 and elastic elements 1022. The carriage 1023 is bar-shaped and having an empty space for locating a CIS module 1021. The length of the CIS module 1021 shall be equal to or greater than one side of the sheet table 107 for linearly reading the image information from the sheet. A plurality of elastic elements 1022, 1024 are interposed between the carriage 1023 and the CIS module 1021. The elastic elements 1022 can adjust the height of the CIS module 1021 while the elastic elements 1024 help to reduce the vibration of the CIS module 1021 while being carried by the CIS carriage 1023. The elastic elements refer to springs or spring leafs for keeping the document sheet 108 in focus.

The guiding device 105 crosses over the bottom center of the CIS carriage 102 for supporting and guiding the CIS carriage 102 in the longitudinal direction of the sheet table 107. The guiding device 105 rests on a pair of seats 106. The seats 106 support the guiding device 105 in a manner that the CIS carriage 102 can contact tightly with the bottom surface side of the sheet table 107. On the top surface of the CIS module 1021, two pieces of sliding elements 103, such as slide-blocks or slippers, are attached thereon to reduce the friction between the CIS carriage 102 and the sheet table 107. The sliding elements 103 also help to keep a document sheet 108 in focus because the thickness of the sliding elements 103 determines the distance between the CIS module 1021 and the document sheet 108.

The driving device 109 includes a conveying element 1091, a set of pulleys 1092, and a driving motor 1093. The set of pulleys 1092 are installed at the ends of the guiding device 105. The conveying element 1091 which is a steel wire rope or a timing belt surrounds the pulleys 1092 in a shape of a closed-loop and connecting to the CIS carriage 102. When the driving motor 1093 is enabled, it drives the pulleys 1092 to rotate. Since the conveying element 1091 and the CIS carriage 102 are connected, the rotation of the conveying element 1091 will drive the CIS carriage 102 to move along the guiding device reciprocally. Since the CIS carriage 102 always contacts the sheet table 107 tightly, it can keep the CIS carriage 102 in balance while moving on the guiding device 105.

Figure 2B:
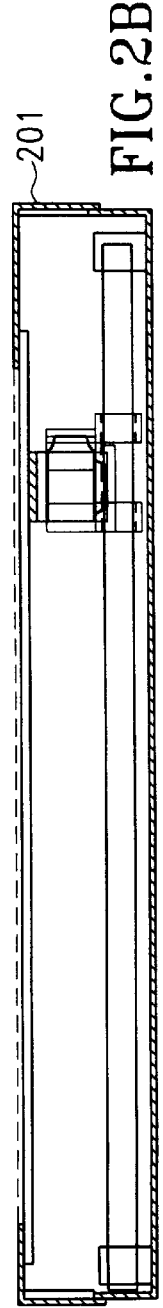
FIG. 2B is a perspective side view schematically showing the structure of another preferred embodiment of the invention.
Figure 2C:
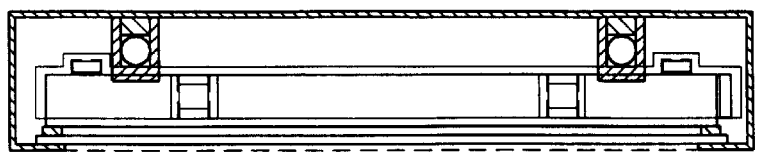
FIG. 2C is a perspective front view schematically showing the structure of another preferred embodiment of the invention.

With its simplicity, the universal CIS carriage can be adapted to guiding and supporting devices of various structures for a CIS scanner. FIGS. 2A–2C shows another example for applying the universal CIS carriage in a CIS scanner. Basically, the major elements in FIGS. 2A–2C are almost the same as in that of FIGS. 1A–1C. In FIGS. 2A–2C, the number of the guiding devices 202 has been changed to two. The driving device 203 is then moved to one bide of a guiding device 202. The CIS carriage 201 remains the same as in FIGS. 1A–1C and needs no further modification.

Figure 3C:
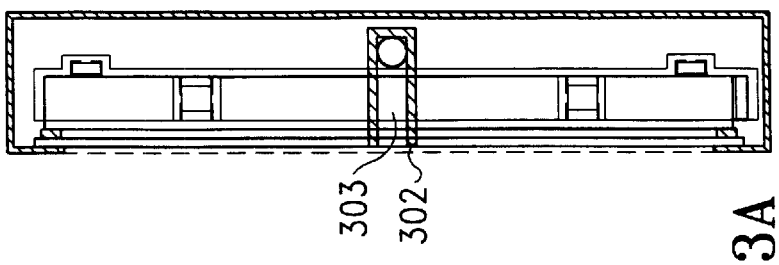
FIG. 3C is a perspective front view schematically showing the structure of another preferred embodiment of the invention.
Figure 3A:
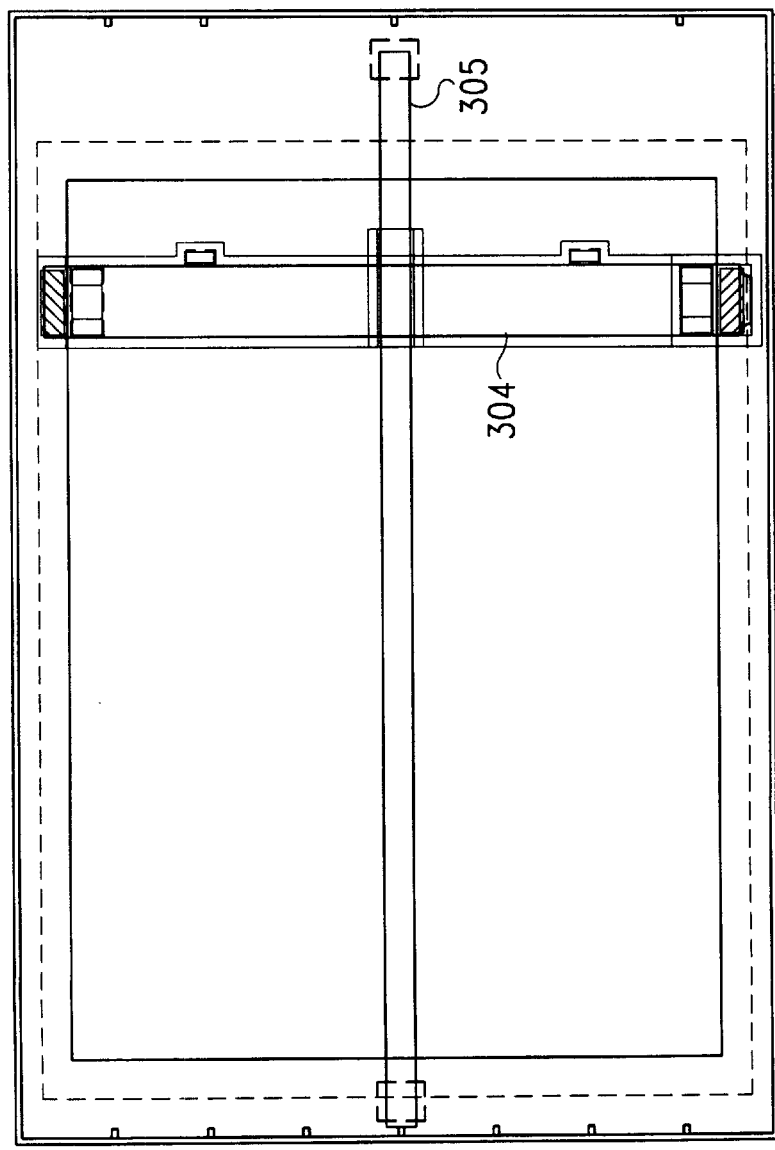
FIG. 3A is a perspective top view schematically showing the structure of another preferred embodiment of the invention.
Figure 3B:
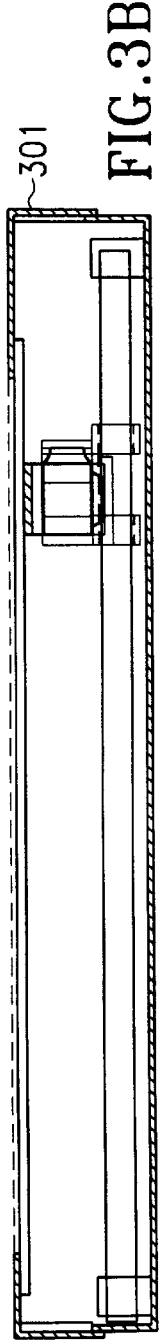
FIG. 3B is a perspective side view schematically showing the structure of another preferred embodiment of the invention.

The preferred embodiments have been described in detail hereinabove. It is to be understand that he scope of the invention also comprehends embodiments different from the one described, yet within the scope of the claims. For example, the elastic elements could be made of other comparable materials. Also, the guiding device could be constructed in different structures. For instance, the seats can be changed to fix on the inner top side of the housing so long as the CIS module can contact tightly with the bottom surface side of the sheet table as shown in FIGS. 3A–3C. The rest elements and devices in FIGS. 3A–3C are similar to that of previous figures.

To sum up, the universal CIS carriage can be adapted to various structures of guiding and supporting devices. It allows the guiding and supporting devices to support the CIS carriage in a manner that the CIS carriage can contact tightly with the bottom surface side of the sheet table. This sufficiently solves the short-focus-length problem occurred if a CIS module. The elastic elements inside the CIS carriage can adjust the distance between the CIS carriage and the sheet table. Thus, the manufacture errors or element distortion can be more tolerable. Consequently, the picture quality of images generated by the scanner can be more stable.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An image information reading apparatus having a housing, and a sheet table on top of said housing for supporting a document sheet, comprising:

a contact image sensor module having a plurality of sliding elements attached on the top surface of both sides of said contact image sensor module;

a carriage disposed beneath the bottom surface side of said sheet table for loading said contact image sensor module, said carriage having a plurality of elastic elements on an inner side wall thereof between said sensor module and said carriage for reducing horizontal vibration of said contact image sensor module; and a plurality of guiding means each disposed beneath said carriage, and mounted on a pair of seats, said pair of seats supporting said guiding means in a manner that said contact image sensor module can contact the bottom surface side of said sheet table tightly with said plurality of sliding elements interposed therebetween.

2. The apparatus as claimed in claim 1, wherein said elastic elements are springs.

3. The apparatus as claimed in claim 1, wherein said elastic elements are spring leaves.

4. The apparatus as claimed in claim 1, wherein the number of said plurality of guiding means is two.

5. An image information reading apparatus having a housing, and a sheet table on top of said housing for supporting a document sheet, comprising:

a contract image sensor module having a plurality of sliding elements attached on the top surface of both sides of said contact image sensor module;

a carriage disposed beneath the bottom surface side of said sheet table for loading said contact image sensor module, said carriage having a plurality of elastic elements on an inner side wall thereof between said sensor module and said carriage for reducing horizontal vibration of said contact image sensor module; and a single guiding device disposed beneath said carriage and crosses over the bottom center of said carriage and mounted on a pair of seats, said pair of seats supporting said guiding device in a manner that said contact image sensor module contacts the bottom surface side of said sheet table tightly with said plurality of sliding elements interposed therebetween.

* * * * *